United States Patent [19]

Wood

[11] 4,378,908
[45] Apr. 5, 1983

[54] REVERSIBLE SOLAR ASSISTED HEAT PUMP

[76] Inventor: Robert A. Wood, 59425 10 Mile, Apt. 6B, South Lyon, Mich. 48178

[21] Appl. No.: 101,687

[22] Filed: Dec. 10, 1979

[51] Int. Cl.³ .......................................... 605D 23/00
[52] U.S. Cl. ................... 237/2 B; 62/324.4; 62/238.6; 62/235.1; 126/419; 126/427; 126/418; 165/29
[58] Field of Search ............... 237/2 B; 62/324.4, 260, 62/2, 238.6, 235.1; 126/419, 427; 165/29

[56] References Cited

U.S. PATENT DOCUMENTS

| | | | |
|---|---|---|---|
| 3,039,453 | 6/1962 | Andrassy | 126/420 |
| 4,020,989 | 5/1977 | Kautz | 126/431 |
| 4,138,996 | 2/1979 | Cartland | 126/420 |
| 4,167,965 | 9/1979 | Rogers | 237/2 B X |
| 4,190,199 | 2/1980 | Cawley et al. | 126/419 |
| 4,205,718 | 6/1980 | Balch | 165/45 |
| 4,232,820 | 11/1980 | Ritter et al. | 237/2 B |
| 4,256,475 | 3/1981 | Schafer | 237/2 B X |

*Primary Examiner*—Albert J. Makay
*Attorney, Agent, or Firm*—Harness, Dickey & Pierce

[57] ABSTRACT

Disclosed is a reversible, solar assisted heating system comprising an unglazed solar heat exchange panel, a storage tank, and a water source heat pump. In the heating mode, heat is collected from the air and sun through one or more unglazed panels, transferred to a storage tank and then to a heat pump. In the cooling mode, heat is transferred by the heat pump to the storage tank and then to the same panel or panels where the heat is rejected to the air.

7 Claims, 7 Drawing Figures

REVERSIBLE SOLAR ASSISTED HEAT PUMP

FIELD OF THE INVENTION

The present invention relates to a heating system comprising a reversible, solar assisted water source heat pump. More particularly, the present invention relates to a heating system having a heat pump operatively connected to an unglazed solar panel through a storage tank which preferably includes a unitized fluid pumping package with a snow removal mechanism for installations where snow accumulation will be a problem.

BACKGROUND AND SUMMARY OF THE INVENTION

In recent years, the availability of oil and gas has failed to keep up with the demand for energy in the United States and other countries. This state of affairs has contributed to the rising cost of oil and gas and to what is commonly referred to as an "energy crisis." There is not only concern for the security and economic well being of citizens but also concern for the availability of energy for heating of homes and other buildings. As a result of these concerns, research and development effort has focused on the development of alternative energy sources. Although such alternative energy sources include nuclear and other sources, a particularly attractive energy source is solar energy. In fact, various federal and state tax credits are given in the United States to encourage development and use of solar energy technology.

However, solar heating systems encounter several problems which must be overcome in order for such systems to be cost effective. One problem which must be overcome in order for a solar space heating system to be practical is that during the winter when there is the greatest need for heating energy, there is relatively less sunlight available than during the summer. Also, during the summer a conventional solar heating system does not contribute to cooling of the home. In short, at their present state of development it is generally not economically practical to purchase and use a conventional solar heating system which typically relies on glazed solar panels. Glazed solar panels are expensive and generally not cost-effective for space heating and cooling. As a result, few heating systems rely only on the sun to heat the interiors of buildings.

Thus, combination systems have been proposed where solar panels are used in combination with an auxiliary heating source such as an air source heat pump. The heat pump supplements the solar panels when the heating demand exceeds the capacity of the solar system. An additional electric resistance heating system may also be required to supplement the heat pump when the heating demand exceeds its capacity. However, such systems have several disadvantages. Air source heat pumps collect heat from the air alone and do not store heat from air at higher day time temperatures for use at night. Night, obviously, is usually the time period of greatest heating demand. This time/temperature relationship is important as the Coefficient of Performance (COP) of the heat pump and the heat output capacity thereof are dependent on the temperature of the heat source. Thus, at the time of greatest heating demand, the air source heat pump is the least efficient and has the least heat output capacity. Another problem with use of air source heat pumps is the formation of frost on the outdoor air heat exchange coil. If left unattended, frost will at times block heat transfer from the outside air to the heat pump. Heat pump COP and heat output capacity decline as frost accumulates. This problem is generally dealt with by an energy expensive defrosting of the outdoor coil. In an air source heat pump, defrosting is usually accomplished by running in the air conditioning mode, i.e. withdrawing heat from the interior of the building to melt the frost. The continual reversal of valves and refrigerant is hard on the unit. Service life and reliability of the air source heat pump are adversely affected by the defrost cycle.

It is manifest that it would be desirable if an economically practical solar heating system could be provided. This is an object of the present invention wherein an efficient, solar assisted, reversible heating system is provided. The system of the present invention employs relatively inexpensive, uncovered panels to collect heat from the sun and/or from the ambient air. The collected heat is transported by fluid to a storage tank which provides a source of heat for a water source heat pump. The system can be reversed for summer cooling.

The reversible heating system of the present invention efficiently uses energy and involves relatively inexpensive components which can be easily installed and serviced. Further features, advantages and understanding of the present invention will be obtained from the following disclosure taken in conjunction with the appended claims and accompanying drawings.

DESCRIPTION OF THE INVENTION

Figure 1:
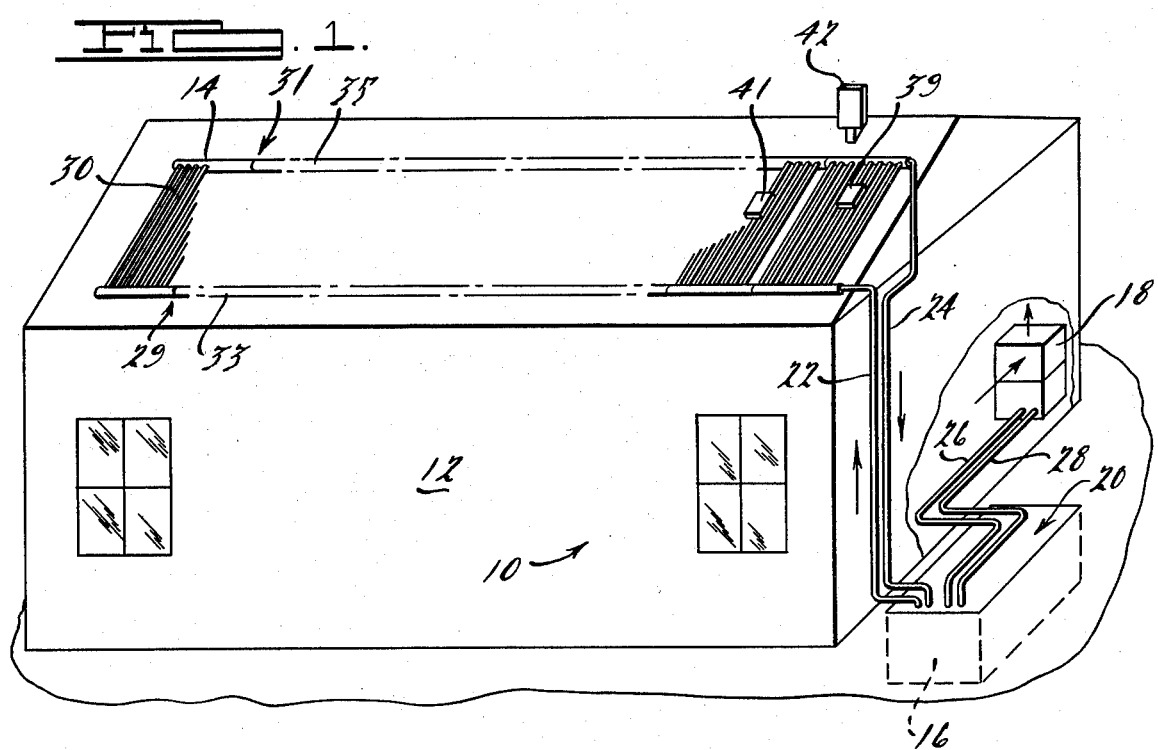
FIG. 1 is a perspective view, with portions broken away, of a building equipped with a reversible heating system of the present invention.

Now referring to the Figures, FIG. 1 shows a heating system 10 of the present invention in operative association with building 12 to provide a heating and cooling system for the interior spaces thereof. Heating system 10 generally comprises an unglazed heat exchange panel 14, a storage tank 16 and a water-source heat pump 18. Unglazed panel 14 is adapted for conducting thermal energy between the panel environment and a heat transfer fluid in the interior of the panel. It is contemplated that a plurality of panels 14 will normally be connected in fluid communicating relationship as illustrated in FIG. 1 to provide a greater panel area than would be had from one panel 14. Conduits 22 and 24 connect storage tank 16 in fluid communication with the inlet and outlet, respectively, of panel 14. Conduits 28 and 26 connect storage tank 16 with the inlet and outlet, respectively, of heat pump 18. Heat pump 18 is a water source type and is preferably reversible so that heating system 10 can be operated either to heat or cool the interior spaces of building 12.

Unglazed heat exchange panels 14 suitable for use in the present invention include commercially available solar heat exchange panels such as are commonly used in solar heating systems for swimming pools. An example of a panel 14 suitable for use herein is shown in U.S. Pat. No. 3,934,323, Jan. 27, 1976, to Ford et al. As mentioned above, it is contemplated that a plurality of panels 14 will be connected as at 29 and 31 to provide fluid communication therebetween and obtain an effective larger panel area than would be provided by a sole panel 14. Suitable panels 14 commonly have an inlet pipe 33 and an outlet or header pipe 35 with a plurality of smaller tubes 30 extending in fluid communication therebetween.

It is important that the heat exchange panels 14 be of the unglazed type. Panels suitable for use in the present invention should have a large wetted surface area and be well adapted for conducting thermal energy between the panel environment and heat transfer fluid in the interior of the panel. Such panels are employed in the present invention for the purpose of collecting heat from, or releasing heat to, the air in addition to collecting heat from direct and diffuse solar radiation. Thus, glazed panels such as have a glass or other transparent cover thereover which transmits short wave (sun) radiation but does not significantly transmit long wave (thermal) radiation do not obtain the advantages of the present invention and are not suitable for use herein.

Panels comprising plastic material are preferred for the following reasons. Plastic panels are inexpensive, light and easily handled, and are durable and highly resistant to corrosion from weather and corrosive heat transfer fluids. Less preferably, metal panels can be used herein. Suitable metal panels include panels made of blown metal sheets such as are known in the art. Corrosion resistant metals such as stainless steel, bronze, brass, and cupro-nickel are operable in the present invention but are expensive. Steel is less expensive but requires a treated brine to avoid corrosion. However, metal panels have an advantage in structural strength. The unglazed panels should be designed to provide a reasonably low pressure drop at the required flow rate of 6 gallons per minute per square foot of exposed panel area. Panel area is sized to accommodate heat load requirements or mounting area restraints. Although, generally, an unglazed panel can be considered to be a panel, sometimes referred to as a solar collector, having no transparent cover spaced from the surface of the panel intended to absorb sun radiation, a more mathematical definition can be provided. Unglazed panels, or collectors, can be defined in terms of solar panel efficiency curves. The American Society of Heating Refrigeration and Air Conditioning Engineers, ASHRAE, defines the solar efficiency curve in ASHRAE Standard 93-77. The solar collector efficiency curve in this disclosure is consistent with the conventional definition in ASHRAE Standard 93-77.

Collector efficiency is defined by a linear equation of the form $$y = mx + b$$

where $y$ = collector efficiency, EFF $m = -F_R U_L$ which is the slope of the line $x = (T_i - T_a)/I_T$ and is also called the collector parameter.

$b = F_R(ta)$ which is the y intersept of the line. Equivalently, $$EFF = F_R(ta) - F_R U_L (T_i - T_a / I_T)$$

where $F_R$ = efficiency factor $(ta)$ = transmittance-absorbance product $U_L$ = heat transfer coefficient, BTU/HR/FT$^2$/°F.

$T_i$ = fluid inlet temperature, °F.

$T_a$ = ambient temperature, °F.

$I_T$ = incident solar radiation, BTU/HR/FT$^2$

Figure 3:
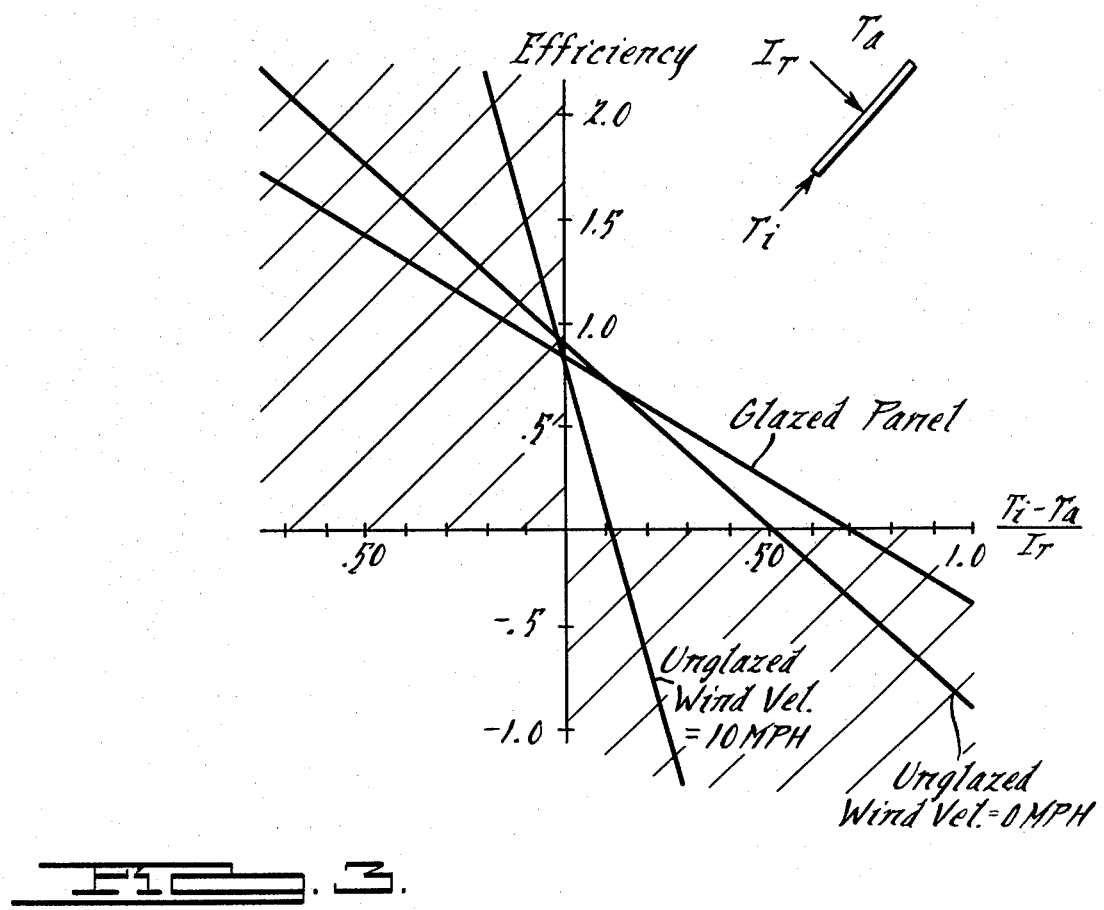
FIG. 3 is a graph illustrating the efficiency curves of glazed and unglazed solar panels.

The positive, unshaded quadrant of the graph of FIG. 3 is a plot of several efficiency curves defined in the conventional manner. Extension of these curves into the shaded quadrants of the graph is not part of the definition of unglazed collector. The significance of these shaded regions is discussed hereinafter in the operation of the present invention.

The y intercept of the efficiency curve, $b = F_R$ (ta), for a particular collector indicates the fraction of short wave, incident solar radition, $I_T$, that is transferred as heat to the collector fluid $F_R$ for a particular solar collector depends on the spacing of fluid passage ways, the heat conductivity of material between the absorber surface and fluid, the fluid properties, fluid flow rate, and $U_L$ which varies with wind speed and sky temperature. (ta) depends on short wave radiation absorbance of the absorber surface and the transmittance and absorbance of short wave radiation of any collector glazings. $F_R$ (ta) is affected somewhat by conduction, convection, or long wave radiation of heat from the top and underside of the absorber plate to the ambient air.

The slope of the efficiency curve, m, is $-F_R U_L$, for a particular collector depends primarily on the transfer of heat between the collector fluid at inlet temperature, $T_i$ and the ambient air at temperature $T_a$. The $-F_R U_L$ term is not significantly affected by the collector's long wave transmittance or absorbance properties. The $-F_R U_L$ term is affected by wind speed and sky temperature. Effects of wind speed and sky temperature are not significant for glazed collectors. For unglazed collectors, wind speed and sky temperature do significantly affect the $-F_R U_L$ term. Thus, the slope of the efficiency curve, $-F_R U_L$, which is indicative of the rate of heat transfer between the collector fluid and ambient air, decreases significantly as wind speed increases and $-F_R U_L$ decreases significantly as sky temperature decreases.

It is possible to define an unglazed collector in terms of the slope, $-F_R U_L$, and intercept $F_R$(ta) of its efficiency curve. The unglazed panel shown in U.S. Pat. No. 3,034,323 which issued Jan. 27, 1976, to Ford et al. has an $F_R$(ta) of between 0.78 and 0.85 depending on wind speed and sky temperature. The $-F_R U_L$ term for the Ford et al. panel varies between $-16$ and $-1.7$ BTU/HR/Ft$^2$/°F. The $-1.7$ BTU/HR Ft$^2$/°F. figure corresponds to zero wind speed and a sky temperature close to the panel fluid temperature. However, panel with $-F_R U_L$ less than or equal to $-1.3$ BTU/HR/Ft$^2$/°F. will result in significant advantages when used in the present invention as a collector of heat from the air and/or sun. Therefore, as used herein, an unglazed panel is defined as a solar collector with $F_R(ta)$ of less than about 0.85 and greater than about 0.75 and $F_R U_L$ of less than about $-1.3$ BTU/HR/Fr²/°F. and greater than about $-20$ BTU/HR/Fr²/°F.

For residential size systems, conduits 22, 24, 26, and 28 can be conventional PVC pipes of a diameter on the order of ¾" to 2". Larger pipe diameters are required on large commercial systems. Generally, conduits 22 and 24 will have a larger diameter and, hence, higher flow rate than conduits 26 and 28. Plastic polyvinyl chloride or PVC pipes are preferred for use as conduits 22, 24, 26 and 28. Chlorinated PVC or CPVC conduits are also suitable. PVC pipe is compatible with a brine storage and heat transfer fluid and will handle the temperature range normally encountered. One advantage of the present invention is that for most installations pipe on the outside or underground does not require insulation. However, pipe on the inside of the house should be insulated. Of course, all plumbing should be designed to account for pipe expansion and contraction, pipe support, building partitions, etc., in conventional fashion.

Fluid flow of fluid 20 through conduits 22 and 24 and through panels 14 is provided by pump 32 and should be at a rate of about 6 gallons per hour per square foot of collector if water solution is used as the heat transfer fluid. The flow of fluid 20 through conduits 26 and 28 and heat pump 18 is provided by pump 34 and should be roughly 3 gallons per hour per ton of heat output capacity. Equivalent flow rates for fluids other than water can be determined if the density and heat capacity of the fluid are known. Pipe and pumps should be sized to accommodate these flow rates.

Figure 2:
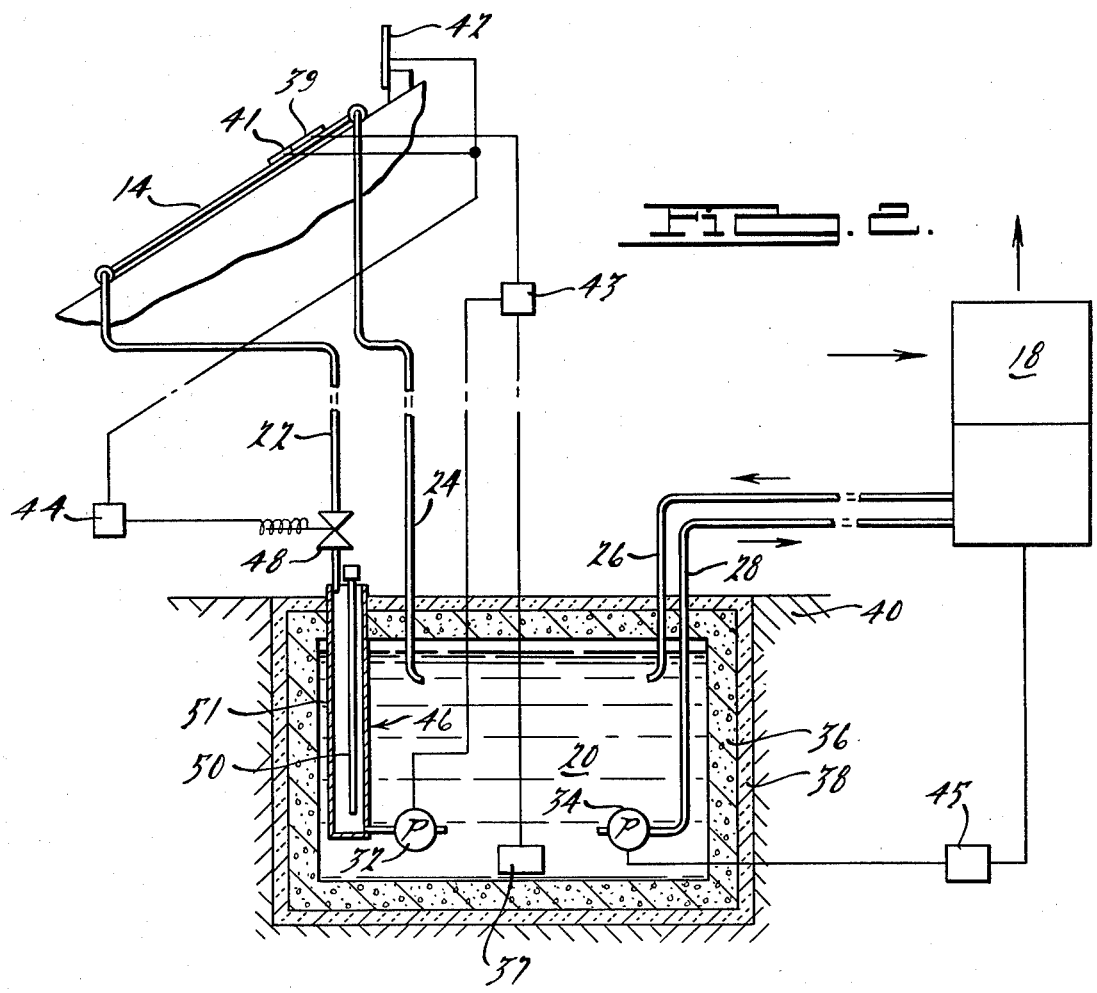
FIG. 2 is a somewhat schematic view of the heating system of the present invention including a vertical sectional view of a storage tank of the invention.

A suitable storage tank 16 is illustrated in FIGS. 1 and 2 and comprises a rectangular parallelpiped enclosure having waterproof walls 36 with a layer of insulation 38 on the outside thereof. Storage tank 16 is positioned below ground 40. Storage tank 16 functions as a reservoir for heat storage fluid 20 and therefore, should be insulated from the environment. However, extensive insulation is not required as the temperature of fluid 20 will usually be close to the outdoor air temperature. Generally speaking, no insulation is required for tank area below the frost line. Storage tank 16 is preferably located outside of the house and can be placed above or below ground. Tanks located in the ground are generally more aesthetically appealing and are slightly superior for use in the present invention. If the tank is located inside of the house, heavier insulation will be required.

Several different types of tanks 16 are suitable for use in the present invention. The least expensive and most convenient tank is a waterproofed concrete septic tank. In most localities it is possible to have a concrete septic tank delivered and set in place for a very reasonable price. Such a tank should be water-proofed on the inside with, for example, Portland cement, Thoroseal ®, an epoxy resin, or other suitable water-proofing material. The large mass of concrete in a septic tank provides extra heat storage capacity. A swimming pool might also be considered for some installations.

The storage capacity of storage tank 16 should be large enough to hold about 3 gallons of water per square foot of panel, for the embodiment illustrated in FIGS. 1 and 2, 1,000 gal. for a 360 square foot panel area. The heat pump output capacity should be on the order of 100 BTU/HR per square foot of panel area. The required volume of storage can be calculated for a fluid other than water if the density and heat capacity of the fluid are known.

Heat pump 18 is a conventional water source heat pump, of 3 ton capacity for the embodiment illustrated in FIGS. 1 and 2. A heat pump suitable for use with the present invention has a water to refrigerant heat exchanger which is compatible with heat transfer fluid 20. Copper-nickel alloys have good corrosion resistance when used with heat transfer fluids comprising untreated brine solutions. The heat pump must also be one in which oil separation or oil foaming will not adversely affect operation at low temperatures. Generally speaking, compressors used in air source heat pumps are protected against these problems, however, compressors used in water source heat pumps may not be protected against problems as they are typically only required, to operate at temperatures above 40° F. The heat pump should have a protection against flooding of the compressor cylinder with liquid refrigerant. Compressor "flood back" is most likely occur at low heat source temperatures. The most common means of protection is to place an accumulator on the suction side of the compressor to trap any liquid refrigerant which may have passed through the evaporator without evaporating.

Heat pumps suitable for use in the present invention must, of course, be reversible, if it is desired to employ the advantages of the present invention in the air conditioning mode. However, in some situations the air conditioning feature of the present invention may not be desired. In this case, it is advantageous to use a heat pump designed for heating only as "heating-only" heat pumps generally outperform reversible heat pumps in terms of efficiency and heat output capacity.

Suitable heat pumps for use in the present invention are commercially available. For example, heat pumps suitable for use in this invention are available from The Carrier Company, Syracuse, N.Y. as the 50WQ series of water source heat pumps. These heat pumps have a cupro-nickel heat exchanger and use the same compressor as the Carrier air source heat pump. The compressor is protected against flood back by a low temperature cut off switch which turns the compressor off if the water temperature is entering the heat exchanger drops below 40° F. However, in order to use these heat pumps in the present invention the low temperature cutoff switch must be disconnected and a suction accumulator should be installed between the evaporator coil and the compressor to prevent excessive amounts of liquid refrigerant from entering the compressor.

A number of heat transfer fluids 20 are satisfactory for use in the present invention, however, it is preferred that fluid 20 be selected from the group consisting of calcium chloride ($CaCl_2$) and sodium chloride (NaCl) brine or mixtures thereof. Several factors affect the choice of heat transfer and storage fluid. A major factor is cost and on this basis NaCl is preferred over $CaCl_2$ as even a residential system will typically contain 500 to several thousand gallons of fluid. Most other suitable fluids are much more expensive then either NaCl or $CaCl_2$. The operating and capital cost of pump and pipe size is sometimes a factor determining choice of fluid. Minimum temperature expected is another factor in fluid selection. Saturated NaCl brine freezes completely at $-6°$ C. Saturated $CaCl_2$ brine freezes completely at $-67°$ F. Another factor to consider is fluid toxicity. NaCl is common table salt. $CaCl_2$ is toxic and will irritate eyes and skin. $CaCl_2$ is sometimes used to melt snow and ice on pavement.

Because of the generally lower temperatures of storage solution 20 as compared to conventional solar heating systems, the present invention can take advantage of the use of a phase change in the heat transfer fluid to provide additional heat storage capacity. As will be appreciated by those skilled in the art of refrigeration, if heat is withdrawn from a brine solution at a constant rate, the temperature of the brine will decline linearly with time until pure water begins to freeze out of the brine. At this point in time, ice crystals of substantially pure water form on the top portion of the fluid 20 and the rate of temperature change slows down. Thus, the concentration of the salt in the remaining brine solution is increased, further lowering the freezing point of the remaining brine until the freezing point of the brine is reached. At the freezing point, almost no further temperature change occurs until the entire mass of brine is frozen. Typically in a system 10 of this invention, a slush is formed instead of solid cake. The entire brine solution will be frozen at a temperature of $-6°$ F. for NaCl brine and $-67°$ F. for $CaCl_2$ brine. However, under conditions of repeated freezing and thawing the brine will become stratified, with highly concentrated brine seeking the bottom of storage tank 16. Such stratification can be alleviated by mixing the transfer fluid 20 in storage tank 16 by drawing fluid 20 from the bottom portion of tank 16 and returning fluid 20 to the top portion of tank 16 by, for example, locating the intake conduits 22 and 28 at the lower part of tank 16 and return conduits 24 and 26 at the upper part of tank 16. Such mixing of the brine will result in a higher brine temperature at the bottom of the tank where pumps must be located for reasons of freeze protection of pumps and plumbing. System 10 with a mixed brine has the advantage of higher heat pump COP and heat output capacity due to a higher brine temperature in the heat pump evaporator and greater heat storage capacity.

The present invention may optionally have means for removing snow from panels 14. A suitable snow removal mechanism is shown in the Figures and has a sensor apparatus comprising sensors 41 and 42 to sense when snow is covering panel 14, control means 44 which determines when the snow removal mechanism should be activated and the length of time the snow removal mechanism will operate and a heating unit 46. A valve 48 is employed to control fluid flow from heating unit 46. While the control decisions can be complex and computer controlled and can be based on inputs from several sensors (not shown in the figures), such as collector fluid temperature, outdoor air temperature, storage fluid temperature, and amount of solar radiation, a relatively straightforward snow removal mechanism is disclosed herein. Of course, the snow removal mechanism can alternatively be manually controlled thereby avoiding use of sensors 41 and 42 as well as control means 44. Sensors 41 and 42 can each comprise a photoelectric cell. One photoelectric cell, or sensor 41 is located such that snow accumulation thereon is about the same as snow accumulation on the array of panels 14. Typically, sensor 41 will be located on the top surface of a panel 14. Optionally, sensor 41 could comprise a plurality of photocells covering various areas of the panel array. The plurality of photocells should be connected so that their output is zero if the output from any individual photocell is zero. Sensing of snow over the entire panel array can be assured in this fashion. A second photoelectric cell, or sensor 42 is placed such that snow will not block solar radiation thereon and oriented in a fashion that will allow solar radiation to strike its surface. Sensor 42 could be oriented vertically facing south and located at a height above which snow will not cover sensor 42. Control means 44, is an electric circuit that senses current from photocells 41 and 42. Control means 44 activates the snow removal mechanism when photocell 41 is at or near zero output and photocell 42 is above a threshold output of electricity. The snow removal mechanism is deactivated after a short time delay when the output of sensor 41 climbs above near zero electricity output as the snow is removed. The short time delay is provided to assure complete snow removal.

Alternatively, sensors 41 and 42 can each comprise a temperature sensor. Thus, sensors 41 and 42 can be thermistors or thermocouples located inside flat boxes that are black in color. Sensors 41 and 42 would then measure the temperature of the ambient air plus additional temperature caused by solar radiation striking the sensor's surface. Control means 44, for this sensing apparatus is an electric circuit that senses output from sensors 41 and 42. Control means 44 activates the snow removal mechanism when sensor 41 indicates a temperature that is significantly less than sensor 42. The snow removal mechanism is deactivated after a short time delay when sensor 42 indicates a temperature that is close to sensor 41.

Heating unit 46 is an in-line, electric heater comprising an electrical heating element 50 provided in tube 51, the outlet of which is in fluid communication with the inlet of conduit 22. Valve 48 is also provided in conduit 22 and when actuated, restricts or limits the flow of fluid 20 therethrough. This restriction of flow is necessary to prevent excessive electricity consumption by electric element 50. Thus, upon actuation of the snow mechanism, the fluid input to panels 14 will be heated to thereby heat panels 14. On the inclined panels, water from melted snow between the panel surface and the snow acts as a lubricant causing unmelted snow to slide off of the panel. The removal of the snow then allows panels 14 to absorb heat from the sun and/or ambient air.

Figure 7:
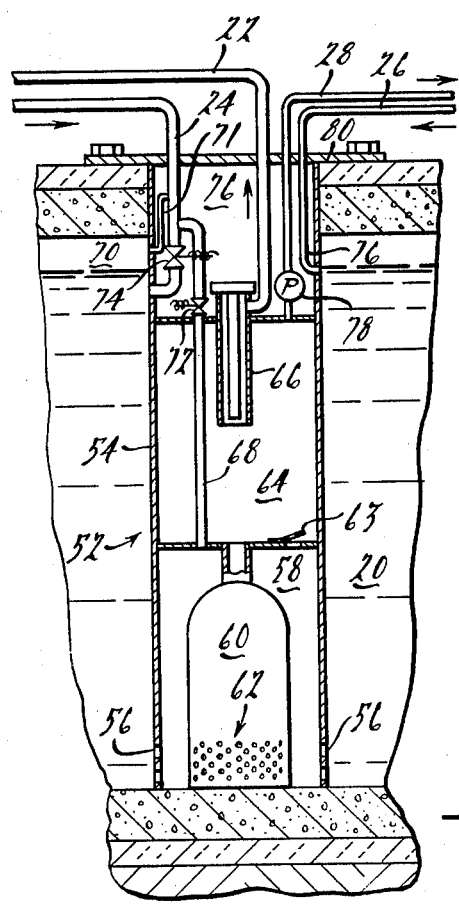
FIG. 7 is a vertical sectional view, broken away, of an unitized fluid pumping package which can be used in the storage tank of the present invention.

Optionally, and preferably, system 10 of the present invention will include an in-tank fluid transfer package 52 as shown in FIG. 7. Fluid transfer package 52 includes the parts required to transport heat transfer fluid 20 and, hence, heat between storage tank 16 and panels 14, and between storage tank 16 and heat pump 18. Package 52 can also include the in-line heater and flow control valves required for the snow removal mechanism. Optionally, sensors, fluid treatment equipment and other parts can be located therein. Thus, package 52 assembles all components that are located in storage tank 16 into one package. This single package 52 can be preassembled and will reduce total costs by providing faster installation, greater reliability, and easier service and maintenance. Also, package 52 provides energy efficient pumping of fluid 20 and energy efficient snow removal. These energy efficiencies are provided in part by locating pumps 60 and 78, valves 72 and 74, in-line heater 66 inside of the storage tank so that waste heat from these parts can be conserved. Most of this waste heat is ultimately transferred from the storage tank to the building interior by heat pump 18.

Now referring to FIG. 7, package 52 has cylindrical container 54 which houses the various components thereof. Container 54 has a plurality of openings 56 at the bottom portion to admit fluid 20 to an interior lower chamber 58 which houses main pump 60. Main pump 60, when activated, draws fluid 20 through apertures 62 in the bottom portion thereof and pumps fluid 20 upwardly into middle chamber 64 of container 54. Disposed in middle chamber 64 is in-line heater 66, the inlet of which is in fluid communication with chamber 64 and the outlet of which is in fluid communication with conduit 22. Middle chamber 64 is in fluid communication with conduit 26. Extending through middle chamber 64 but in fluid communication therewith is conduit 68 which communicates lower chamber 58 and conduit 24.

Conduit 68 and lower extension 70 of conduit 24 have respective valves 72 and 74 to, upon activation of the snow removal mechanism, direct returning fluid 20 to chamber 58. Thus, upon actuation of the snow removal mechanism, values 72 and 74 act to recirculate fluid 20 through the collector and collector pump loop loop without returning fluid 20 to the top of the storage tank. On actuation of the snow removal mechanism fluid 20 in chambers 58 and 64 is likely to be close to 40° F. (snow melts at 32° F., several additional degrees are required to transfer the heat from fluid 20 to the snow). Fluid 20, located in the storage tank, is most likely to be colder; 25° F., for example. So, recirculation of fluid 20 through chambers 58 and 64, and not through the entire storage tank is an energy saving feature that prevents unnecessary heating of fluid 20 in the storage tank by in-line heater 66.

Upper chamber 76 of container 54 houses pump 78 which pumps fluid 20 from middle chamber 64 through conduit 28 to heat pump 18. Upper chamber 76 also houses valves 74 and 72, and portions of conduits 22, 24, 26 and 28 as well as an air bleed line 71. Lower extension 70 and the lower portion 76 of conduit 26 communicate with the main body of fluid 20 in storage tank 16 through the side wall of upper chamber 76. A removable cover 80 is provided over the open top of container 54. Package 52 is designed to be installed by sliding said package through a hole provided in the storage tank. Thus, the exterior of package 52 has no protrusions extending outwardly therefrom.

Air bleed line 71 is, for example, ½ inch inner diameter line whose function is to allow air to pass from the top of concrete tank 16 to conduit 24. This transfer of air causes the panels 14 to drain down. Draining of fluid 20 from panels 14 relieves the panels, panel couplings and piping from negative pressure stresses. Drain down also conserves energy. Undrained fluid in panels and pipe might loose heat to the surrounding environment when such loss is not desired. This potential energy loss is prevented by returning the fluid to tank 16 when pump 60 is turned off. Although drain down can be provided in a number of ways, the drain down apparatus disclosed as part of package 52 has an advantage over an air bleed line extending to the top of panels 14 in that less plastic tubing is required. Installation labor and material costs are saved by including a shorter, pre-plumbed air bleed line as a part of package 52. This drain down apparatus is preferred over a vacuum relief type of device located near the top of the panels for the following reasons. First, if the storage tank is air tight, drain down of fluid 20 will be hampered by buildup of air pressure in the storage tank. Second, evaporation is prevented using a closed system. Finally, an air tight storage tank and plumbing system is desirable, particularly if steel is used to fabricate the panels or other parts of system 10. An air tight system prevents the addition of oxygen rich external air to air internal to pipe and plumbing of system 10. The presence of oxygen in the air or brine causes increased corrosion rates of metals, expecially steel. The corrosion rate for steel located in an oxygen depleted air and brine environment is significantly less than the corrosion rate for steel in an oxygen rich air and brine environment. Oxygen is removed from the fluids in a newly installed air tight system by the formation of a layer of iron oxide or rust on steel parts exposed to the oxygen. This layer of rust also acts as a barrier to corrosion. Even so, an oxygen depleted environment is of value because brine flowing at sufficient velocity against an oxidized steel surface will tend to remove any protective rust coating that might form. An oxygen rich environment in this situation could lead to greatly increased corrosion rates. Corrosion of steel in brine can be further reduced by galvanic coupling with an anode material and control of pH to between 7.0 and 8.5.

One-way flapper valve 63, located between chambers 58 and 64, allows pump 78 to easily draw fluid 20 from the main interior of tank 16 through chamber 58 into chamber 64 and then into conduit 28. Absent valve 63, pump 78 would have to draw fluid 20 through pump 60. Arranging pumps 78 and 60 in the series manner as shown in FIG. 7 obtains the advantage that when pump 60 is pumping, pump 78 receives an additional pressure boost. This causes more of fluid 20 to flow through conduits 28 and 26 to the heat pump. This increased flow rate increases the heat pump COP and heat output capacity. Arranging pump 60, chamber 64, and conduit 28 in the communicating fashion shown in FIG. 7 gains the additional advantage that pump 78 may be located above the fluid 20 level in the tank. Pump 78 can be primed by simply turning pump 60 on for a short period.

Noise from package 52 is kept at minimum level by locating package 52 outside of the house. Pump 60 is, in addition, submersed in fluid 20. The outlets of conduits 24 and 26 returning fluid 20 from the panels and collectors respectively are submersed to prevent noisy splashing of fluid 20. Air bleed line 71 is used instead of an air relief valve to avoid the whistling noise common to the latter when the panels are draining down. Package 52 is designed to assure mixing of heat transfer fluid 20 in storage tank 16. Thus, if brine is used for heat transfer fluid 16, the heavier, more concentrated brine will be withdrawn from the bottom of the tank and returned to the top of the tank to provide mixing and more even concentration. Of course, materials for components of the heat transfer package should be selected to be compatible with the heat transfer and storage fluid.

Further understanding of the present invention will be obtained from the following description of the operation thereof. First, considering heating system 10 in operation in the heating mode, when the temperature in the interior of the building 32 is below that desired, thermostat 45 (shown diagramatically in FIG. 2) activates heat pump 18 in a conventional manner. Simultaneously with activation of heat pump 18, submersed pump 34 is activated to bring pumping transfer fluid 20 from storage tank 16 through conduit 28 to heat pump 18 which extracts heat therefrom and transfers the heat to interior air in building 12. The transfer fluid is transported from heat pump 18 back to storage tank 16 through conduit 28. A temperature sensor 37 is located in the bottom of tank 16 and measures the temperature of fluid 20 therein. A temperature sensor 39 is located on panel 14 and measures the temperature thereof. Whenever sensor 39 indicates that panels 14 are warmer than the fluid 20 in storage tank 16, main pump 32 is activated by a standard differential control to transfer the fluid 20 to the interior of panels 14 where fluid 30 circulates therein and is heated thereby before returning to storage tank 16 via conduit 24.

For operation in the air conditioning mode, the above cycle is reversed. Thus, when the temperature in the interior of building 12 is above that desired, the thermostat turns on heat pump 18 in the reverse or cooling direction. Simultaneously with activation of heat pump 18, submersed pump 34 is activated. In the air conditioning or cooling mode, main pump 32 is activated by a differential control when the temperature sensors 37 and 39 indicate that panels 14 are lower in temperature than the fluid 20 in storage tank 16.

Still further understanding of the operation of system 10 of the present invention wherein heat is rejected through panels 14 in the cooling mode and is acquired through panels 14 in the heating mode will be obtained from the following description of the theory of its operation. While applicants do not wish to be limited by the following theory, it is believed important to a general understanding of the advantages of the present invention.

FIG. 3 graphically illustrates the relative efficiences of glazed and unglazed solar panels or collectors. The heat collected or rejected is, through any particular collector represented by an efficiency curve, the product of solar radiation incident on the collector surface, $I_T$, and collector efficiency. The collector efficiency can be found if the collector parameter, $(T_i - T_a)/I_T$, is known. These terms were defined previously. A positive value for collector efficiency indicates that heat is gained by the solar panel. A negative value for collector efficiency indicates that heat is rejected by the solar panel. In the heating mode, the pump 32 pumps when the collector efficiency is positive and heat is collected and stored by fluid 20 in tank 16. In the cooling mode, pump 32 pumps when collector efficiency is negative and heat stored by fluid 20 in tank 16 is released to the environment through panels 14.

Solar collectors are typically assumed to operate only in the unshaded, positive quadrant of FIG. 3. In this quadrant a collector's heat gain from the sun is greater than its heat loss to the outside air. Thus, there is a net heat gain by the collector and collector efficiency is positive and a glazed collector is usually more efficient than an unglazed collector. However, if this typical assumption is relaxed and the collector efficiency curve is extended into the shaded quadrants, the value of an unglazed panel can be recognized. The shaded quadrant in which efficiency is positive illustrates that in this quadrant the unglazed panel is significantly more efficient than the glazed panel. It is sensible that an unglazed solar panel would be more efficient than a glazed solar panel if the ambient air $T_a$, is greater in temperature than the collector inlet fluid temperature, $T_i$. The transparent cover of a glazed collector reflects and absorbs a significant portion of the solar radiation and when $T_i$ is less than $T_a$, the transparent cover is also a barrier to heat gain from the ambient air.

Now, by extending the collector efficiency curve to negative efficiencies, the value of an unglazed collector used as a rejector of heat for air conditioning can be recognized. This situation is represented in the shaded, lower right quadrant of FIG. 3. The unglazed panel is a better rejector of heat for all values of the collector parameter, $(T_i - T_a)/I_T$, in this shaded quadrant.

In the heat mode, this suggestion is corroborated by the graph of FIG. 3 wherein storage temperature is shown as a function of panel area for both glazed and unglazed panels for the aforementioned house and heating system of the present invention during an average January in a northern climate of Detroit, U.S.A. The importance of storage temperature is realized when it is remembered that heat pump COP and heat output capacity depend on the storage temperature.

Figure 4:
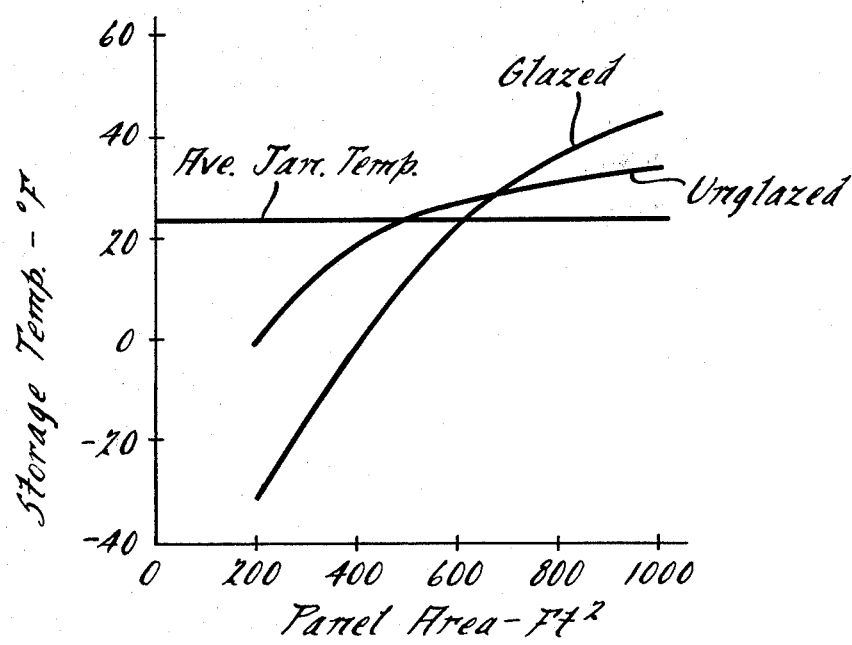
FIG. 4 is a graph illustrating average heat transfer fluid temperatures in a storage tank of the present invention for glazed and unglazed panels in use during a typical winter month.

As shown in FIG. 4, the storage temperature is higher for an unglazed panel until panel sizes of more than 600 square feet are employed. As will be appreciated by those skilled in the art, the panel areas required to obtain higher storage temperatures for glazed panels are large and, hence, very expensive. Panels of greater than 600 square feet in size, in fact, are larger than one-half of the roof area of the model house of FIG. 1 and hence, would be difficult to install.

Figure 5:
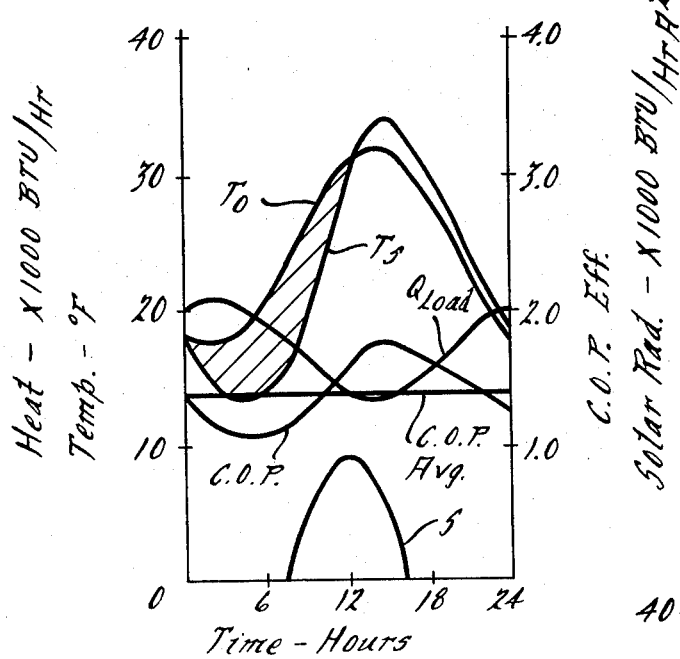
FIG. 5 is a graph illustrating the functioning of a heating system in FIGS. 1-2 during a 24 hour period.
Figure 6:
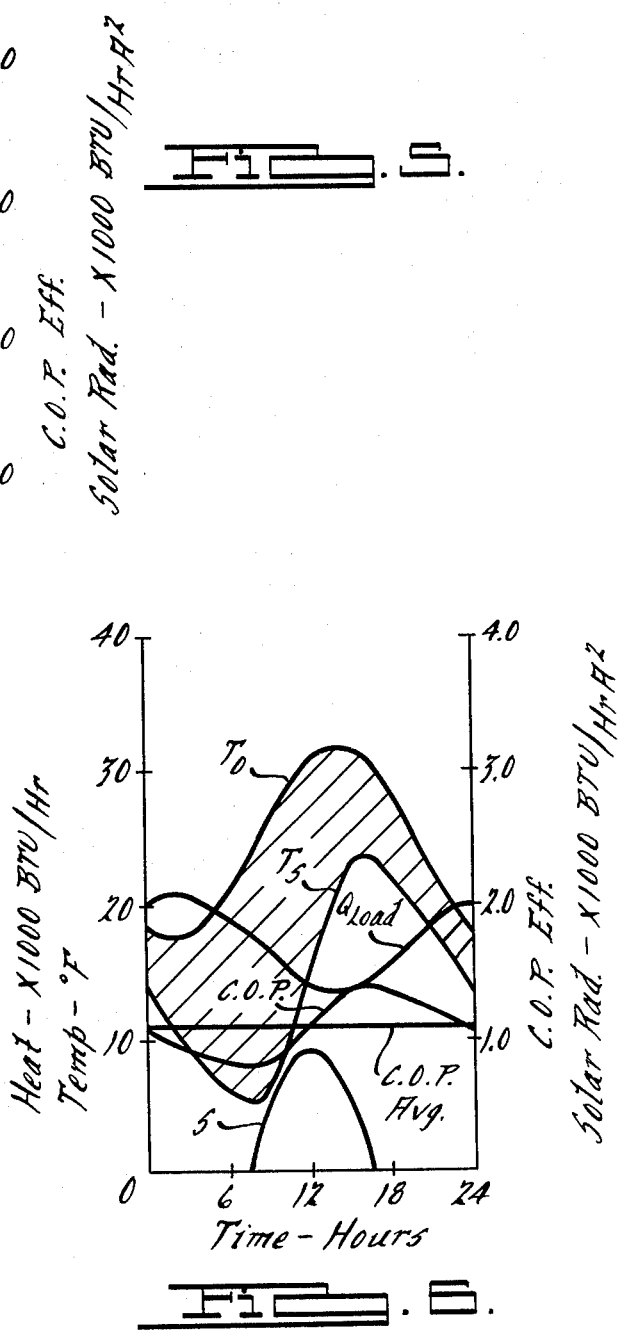
FIG. 6 is a graph similar to that of FIG. 5 but illustrating the functioning of a heating system having glazed panels substituted for the unglazed panels.

FIGS. 5 and 6 illustrate that the ambient temperature will often be greater than the storage temperature. Under these circumstances, heat is absorbed by the unglazed panel and transferred to the storage tank. Analysis of FIG. 6 reveals that all of the heat collected by the glazed panels occurs when $T_i$ is less than $T_a$. This would correspond to the shaded upper left quadrant of FIG. 3, In this quadrant the unglazed collector is much more efficient. When the aforementioned collector efficiency is less than zero, the panels will not collect heat, i.e., the collector pump will be off. The heat pump draws heat from the storage tank as is necessary to meet the heat demand. If heat demand exceeds the heat output capacity of the heat pump, heat from an auxiliary source will supply the balance of the heat demand.

Now referring to FIGS. 5 and 6, an understanding of the surprising efficiency of the present invention will be had. In FIGS. 5 and 6 a typical January day in a northern part of the United States is presented in graph format showing the time of day on the x-axis and the ambient temperature and COP efficiency of a typical heat pump on the y-axis. In FIGS. 5 and 6:

$T_a$ = ambient air temperature in °F.
$T_s$ = storage temperature in °F.
COP = coefficient of performance of the heat pump
S = radiation of the sun
$Q_{load}$ = house heat demand
$COP_{avg}$ = average COP over the day The hatched area between the curves $T_o$ and $T_s$ emphasizes the time of day during which the ambient air temperature is greater than the storage temperatures and, of course, the difference between the two temperatures. As can be readily seen by comparing the hatched areas of FIGS. 5 and 6, the unglazed panel of FIG. 5 enjoys considerably better performance than does the glazed panel. As a result, the heat pump, as illustrated, performs at a higher average COP and has greater heat output capacity.

It will be appreciated by those skilled in the art that the present invention is well calculated to achieve the objects herein set forth. It will also be appreciated by those skilled in the art that the invention disclosed herein is practical in nature and repesents a significant advancement in the art. Further it will be appreciated that the specific embodiments of the present invention disclosed herein are subject to modification, variation and change without departing from the spirit of the present invention.

What is claimed is:

1. In a solar assisted heating system comprising at least one solar collector panel, connected in fluid communication with a storage tank by conduit means, a snow removal mechanism for removing snow from said panel, said snow removal mechanism comprising an in-line heating element positioned in said conduit means providing fluid communication from said storage tank to said panel, means for transporting a heat transfer fluid at a less than normal flow rate through said heating element to said panel, and means for actuating said heating element, said heating system further comprising sensing means for sensing snow on said panel and automatic control means for actuating said heater in response to said sensing means sensing snow on said panel, said sensing means comprising a first sensor positioned on said panel and facing in parallel relationship therewith and a second sensor positioned proximate to said panel and facing generally horizontally.

2. In a solar assisted heating system comprising at least one solar collector panel in fluid communication with a storage tank in fluid communication with a heat pump, a heat transfer package located in said storage tank, said package comprising a container having a lower chamber, a middle chamber, and an upper chamber, and wherein said lower chamber has a main pump therein for selectively effecting the transfer of fluid into said middle chamber under pressure and wherein said middle chamber is connected to a conduit communicating with said panel and to a conduit communicating with said heat pump.

3. The system as recited in claim 1 including a heat transfer package positioned in said storage tank, said package comprising a container having a lower chamber, a middle chamber, and an upper chamber, and wherein said lower chamber has a main pump therein for selectively effecting the transfer of fluid into said middle chamber under pressure and wherein said middle chamber is connected to a conduit communicating with said panel and to a conduit communicating with said heat pump.

4. The system as recited in claim 3 wherein a second pump is positioned in said conduit communicating with said heat pump.

5. A solar assisted heating system as recited in claim 1 wherein each of said first and second sensors are photoelectric sensors.

6. A solar assisted heating system as recited in claim 1 wherein each of said first and second sensors is a temperature sensor.

7. In a solar assisted heating system as recited in claim 2, wherein a second pump is positioned in said conduit communicating with said heat pump.

* * * * *